United States Patent [19]

Weeks et al.

[11] Patent Number: 4,836,261
[45] Date of Patent: Jun. 6, 1989

[54] SAFETY TIRE AND TAKE-APART WHEEL CONSTRUCTION

[75] Inventors: James B. Weeks, Eaton Rapids; Roger E. Payne, Okemos; Roger E. Swartz, Holt, all of Mich.

[73] Assignee: Motor Wheel Corporation, Lansing, Mich.

[21] Appl. No.: 30,845

[22] Filed: Mar. 27, 1987

[51] Int. Cl.$^4$ ............................ B60C 7/24; B60B 25/02
[52] U.S. Cl. .................................... 152/405; 152/398; 152/DIG. 10; 301/35 R
[58] Field of Search ............... 152/401, 402, 405, 397, 152/398, 396, DIG. 10; 301/35 R

[56] References Cited

U.S. PATENT DOCUMENTS

| | | | |
|---|---|---|---|
| 1,991,594 | 2/1935 | Case | 152/401 |
| 2,410,573 | 11/1946 | Eksergian | 301/63 |
| 2,802,507 | 8/1957 | Clark | 152/401 |
| 2,810,419 | 10/1957 | Woodward | 152/405 |
| 2,827,100 | 3/1958 | Herzegh | 152/410 |
| 2,871,905 | 2/1959 | Stanton | 152/404 |
| 3,007,741 | 11/1961 | Brown | 301/13 |
| 3,118,485 | 1/1964 | Le Jeune | 152/410 |
| 3,593,764 | 7/1971 | Smith | 152/411 |
| 3,865,170 | 2/1975 | Mitchell | 152/405 |
| 3,880,219 | 4/1975 | Mitchell | 152/405 |
| 3,885,615 | 5/1975 | Mitchell | 152/411 |
| 4,102,379 | 7/1978 | Kamiya | 152/405 |
| 4,106,543 | 8/1978 | Sano | 152/405 |
| 4,165,777 | 8/1979 | Sano | 152/DIG. 10 |
| 4,234,236 | 11/1980 | Inbody | 152/411 |
| 4,253,514 | 3/1981 | Imamura | 152/405 |
| 4,327,791 | 5/1982 | Strader | 152/401 |
| 4,372,365 | 2/1983 | Osada et al. | 152/411 |
| 4,438,797 | 3/1984 | Suckow | 152/410 |
| 4,466,670 | 8/1984 | Kaji | 152/405 |
| 4,481,997 | 11/1984 | Strader | 152/401 |

FOREIGN PATENT DOCUMENTS 529760  1/1921  France ................................ 152/405

Primary Examiner—Robert B. Reeves
Assistant Examiner—Joseph D. Pape
Attorney, Agent, or Firm—Barnes, Kisselle, Raisch, Choate, Whittemore & Hulbert

[57] ABSTRACT

A take-apart wheel rim and disc assembly for use in a safety tire and wheel assembly which includes a pneumatic tubeless tire. The wheel includes an inboard rim part, a wheel mounting disc having an outer marginal flange telescoped into and secured to the inboard rim part, the disc flange having an outer surface protruding axially outboard beyond and clear of the inboard rim part. An outboard rim part telescopically received from an axially outboard direction over the disc flange, an O-ring seal disposed between the disc and opposing surfaces of the inboard and outboard rim parts, and a clamp ring for axially clamping the outboard and inboard rim parts together with the O-ring captured in compression between the disc and the opposing surfaces of the rim parts to seal against air leakage. The disc has an air bleed vent structure outboard of the O-ring and normally sealed from the tire cavity by the O-ring. The clamp ring and associated fasteners engage and exert clamping stress on the outboard rim part over a range of relative movement therebetween in the axial direction relative to the inboard rim part which is sufficient to permit loss of sealing pressure at the O-ring prior to loss of clamping engagement to thereby permit air leakage past the O-ring through the air bleed vent structure to atmosphere within the range of relative movement.

12 Claims, 1 Drawing Sheet

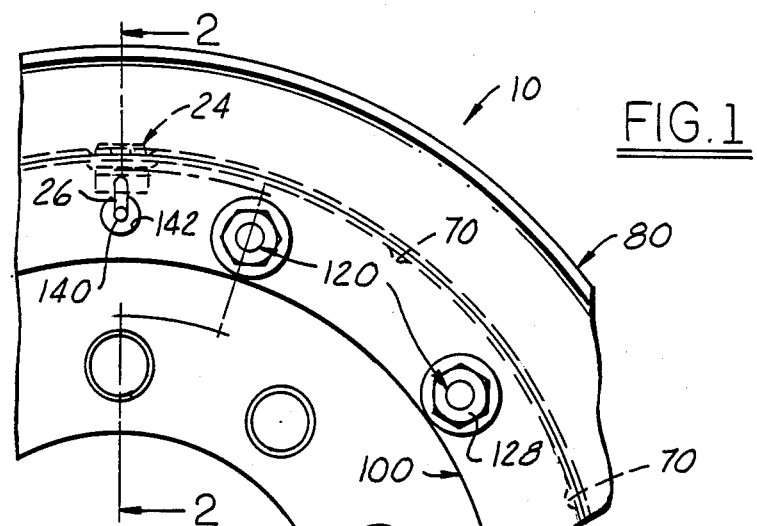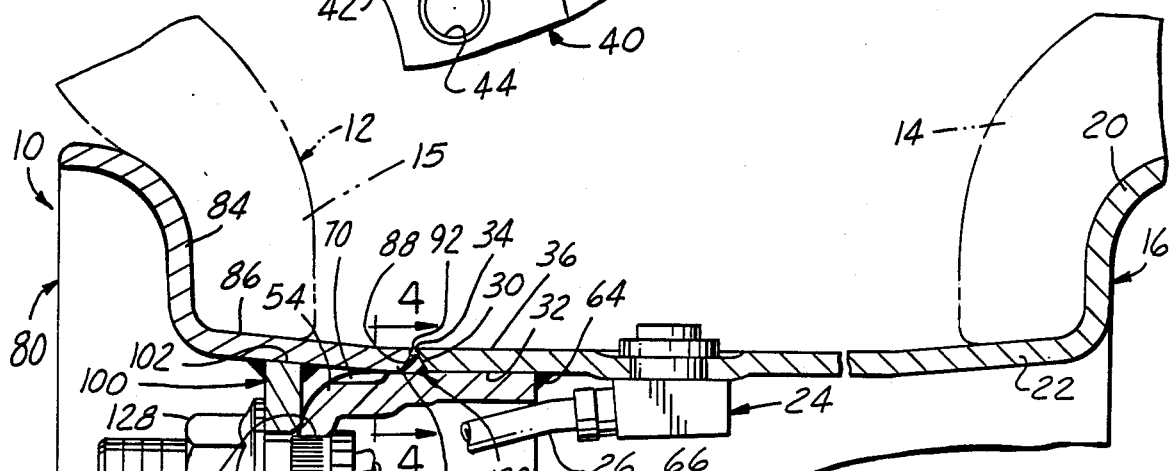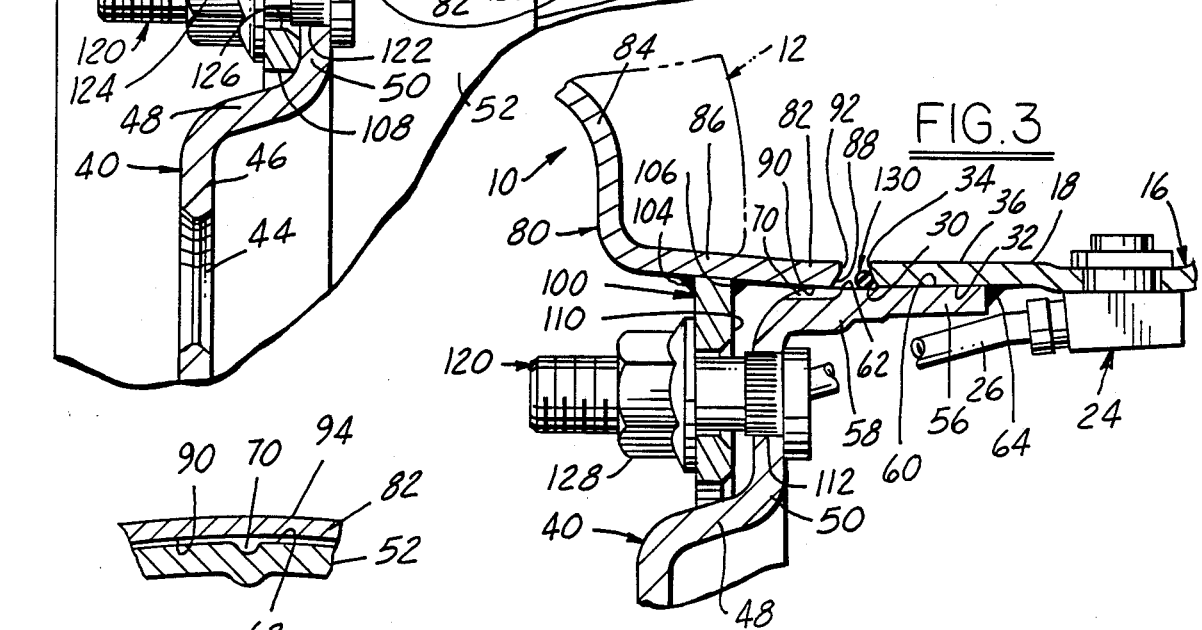

SAFETY TIRE AND TAKE-APART WHEEL CONSTRUCTION

FIELD OF THE INVENTION

The present invention relates generally to wheel assemblies for pneumatic tubeless tires, and more particularly to take-apart safety wheel assemblies of the type having removable flange rings for mounting or demounting a tubeless pneumatic tire thereon and to structure for sealing such split-type wheels upon assembly of the flange ring after mounting the tire on the wheel.

BACKGROUND OF THE INVENTION

It has long been the practice in the construction of wheels for trucks and other heavy duty highway or off-highway equipment, including military vehicles, to provide a multi-piece type wheel assembly utilizing a rim of the split-type in order to facilitate the mounting or demounting of heavy duty tubeless pneumatic tires thereon. In such multi-piece wheels, it has also been conventional to employ a sealing member, such as an O-ring or other sealing ring having specially contoured cross-sectional configurations, which is interposed between the removable flange ring and the other disc and rim parts of the wheel to seal the tire and rim to maintain the necessary air tightness between them. Typically a groove is required for inserting the sealing member and retaining the same in place, which in turn has heretofore required shaping of such a groove in the wheel structure by such mechanical operations as cutting, pressing, shaping or casting.

Examples of such prior art multi-piece wheel rims with sealing members may be found in the following prior art U.S. Pat. Nos.: 1,991,594; 2,802,507; 2,810,419; 2,827,100; 2,871,905; 3,007,741; 3,118,485; 3,593,764; 3,865,170; 3,880,219; 3,885,615; 4,102,379; 4,106,543; 4,234,236; 4,253,514; 4,327,791; 4,372,365; 4,438,797; 4,466,670; and 4,481,997.

The above listed U.S. Strader Pat. Nos. 4,327,791 and 4,481,997, assigned to the assignee herein, disclose take-apart military vehicle wheels employing O-ring sealing and adapted to be equipped with a safety insert device disposed internally of a tire mounted on the rim for supporting the tire tread in a deflated condition to thereby provide a so-called "run-flat" wheel construction. The Strader '997 patent also discloses and claims an important safety feature useful in multi-piece wheel rim assemblies, whether considered alone or in combination with safety inserts of the above-described type, which overcomes a significant safety hazard if it is attempted to inflate a tire mounted thereon when the various wheel assembly components are improperly positioned or seated, or to disassemble the rim when the tire mounted thereon is inflated. In the Strader '997 patent wheel construction, the disc and inboard rim part are made as one piece, and the O-ring is captured between a shoulder, at the junction of the disc with the inboard rim part, and an up-turned flange at the inner edge of the outboard rim part. Safety vent means in the form of a groove or aperture in the disc-inboard rim piece is located on the outboard side of the seal when in assembled position. Such safety vent means is operative to prevent inflation of a tire mounted on a wheel assembly when the wheel assembly components are improperly positioned and/or to automatically vent the tire cavity to atmosphere prior to disconnection of the outboard rim part should disassembly be attempted when the tire mounted thereon is inflated.

Although the aforementioned Strader '997 patent safety wheel and run-flat wheel construction has been manufactured commercially and operates successfully for use on certain military vehicles, certain problems nevertheless remain, such as cost of manufacture, lack of design flexibility to accommodate different wheel offsets, the need for special spin forming manufacturing equipment, the presence of difficult-to-manufacture skip-welds in the O-ring seal area and the need in some applications for increasing the inflation valve turret/stem-to-brake clearance.

Accordingly, an object of the present invention is to provide an improved take-apart wheel rim assembly for tubeless pneumatic tires, including safety tire and wheel assemblies of the above-described type which provides a safety vent feature, which may be of the aforementioned Strader '997 patent take-apart wheel constructions, while at the same time overcoming the aforementioned problems present in such wheel constructions.

BRIEF DESCRIPTION OF THE DRAWINGS

The invention, together with additional objects, features and advantages thereof, will be best understood from the following description, the appended claims and the accompanying drawings in which:

FIG. 1 is a fragmentary side elevational view of the outboard side of a wheel assembly of the present invention with the parts illustrated in fully assembled relationship.

FIG. 2 is a vertical or radial cross-sectional view taken in the line 2—2 of FIG. 1, with the inboard and outboard tire beads shown fragmentarily in phantom lines mounted on the disc and rim assembly.

FIG. 3 is a cross-sectional view taken on line 2—2 of FIG. 1 and showing the outboard flange ring partially disassembled from the disc and inboard rim part subassembly.

FIG. 4 is a fragmentary vertical sectional view taken on the line 4—4 of FIG. 2.

DETAILED DESCRIPTION OF PREFERRED EMBODIMENTS

In the following description and claims, directional adjectives such as "inboard" and "outboard" are taken with reference to preferred orientation of mounting of the wheel, etc., on a vehicle, and no undue limitations should be inferred therefrom where such directional adjectives are not essential to operation of the structural and functional features of the inventions.

FIGS. 1–4 illustrate a presently preferred embodiment of a take-apart safety tire and wheel assembly in accordance with the invention as comprising a wheel assembly 10, a tubeless pneumatic tire 12 (shown fragmentarily in phantom in FIG. 2) mounted by its inboard and outboard tire beads 14 and 15 on wheel 10. Wheel assembly 10 includes an inner rim part 16 having a cylindrical rim base 18 and an inboard bead retaining flange 20 integrally projecting radially outwardly therefrom and coupled thereto by an industry standard five degree bead seat 22. A conventional inflation valve turret 24 extends through and is mounted to rim base 18 and has an associated valve stem 26 for inflation of the tire and wheel assembly. The outboard edge of inner rim part 16 is finished machined to provide an inclined surface 30 extending between the inner cylindrical surface 32 of rim base 18 to a junction with a radially extending end face 34, also finished machined, which extends radially outwardly to the outer cylindrical surface 36 of rim base 18. Preferably, surface 30 is inclined at an angle of 30° to face 34, or at an angle of 60° to the axis of wheel 10 in a radially inward and inboard direction. It thus will be seen that the flange-remote edge of rim part 16 constitutes a cylindrical band defined by inner and outer cylindrical surface 32 and 36 respectively and the free edge machined surfaces 30 and 34.

Wheel 10 also includes a wheel mounting disc generally indicated at 40 which includes a hub opening 42 (FIG. 1) and a circular row of stud openings 44 formed in a radially extending mounting portion 46 of disc 40, wheel mounting studs (not shown) being insertable through stud openings 44 for mounting wheel assembly 10 on a vehicle in the usual manner. Disc 40 has a conical shoulder portion 48 integral with portion 46 and extending radially outwardly in inboard direction to a junction with a radially outwardly extending clamp mounting portion 50. Disc 40 also has a generally cylindrical outer marginal flange 52 integrally joined through a curved section 54 to disc portion 50. Flange 52 is die-struck, coined, rolled, formed, or machined to offset a free edge portion 56 thereof radially outwardly by 0.030 to 0.037 inches relative to the outboard half 58 of flange 52 so that the outer surface 60 of flange portion 56 is likewise offset radially outwardly from the outer cylindrical surface 62 of flange portion 58. The radially outwardly offset free-edge portion 56 of flange 52 may have a slight radially outwardly diverging angle relative to the wheel axis of say between 0 and 2°, and is dimensioned such that surface 60 will have a press fit in assembly with the inner surface 32 of the aforementioned cylindrical band of rim base 18 when disc 40 and inner rim part 16 are telescoped together to their assembled position shown in FIGS. 2 and 3. These parts are then joined by a circumferentially continuous arc weld 64 at the junction of the inner end face 66 of flange 52 and surface 32.

In accordance with the safety vent feature as disclosed in the aforementioned Strader U.S. Pat. No. 4,481,997, a circumferential array of axially extending air bleed passages or channels 70 are formed as radial depressions in the cylindrical outer surface 62 of flange 52 at a preferred angular spacing of about 40°, as by die striking, coining or surface machining of flange 52. As best seen in FIGS. 2 and 3, channels 70 open out at their outboard ends in the curved section 54 of disc 40 and terminate at their inboard ends a predetermined distance, axially outboard of the junction of surfaces 62 and 60 of flange 52, this distance being sufficient to not prevent sealing when the wheel is fully assembled.

Alternatively, in lieu of the 8 or 9 air bleed channels 70, the surface 62 of flange 52 may be knurled by rotating disc 40 about its axis with a knurling tool brought against the surface 62 throughout the circumferential extent thereof to form a very large number of radially shallower, but much more circumferentially closely spaced, vent passages which extend axially of flange 52 in the same manner as the channels 70.

In some cases, it may be sufficient to simply drill or punch holes in the same area through the disc portion in the same position and instead of grooves 70 so that the air exhaust radially inward during an accidental inflated disassembly, similar to the apertures 124 shown in FIG. 6 and described in the aforementioned Strader U.S. Pat. No. 4,481,997.

However, it is possible that no additional safety vent grooves or holes will be needed. As the assembly nuts 128 are removed while the tire is inflated, the outer rim clamp ring subassembly 80 will flex axially outward until the sealing member 130 slips past the sealing surface 88 and is forced by the air pressure over the disc face 34 shoulder radius 54. When this occurs, the air exhausts quickly. If an improper asymmetrical nut removal pattern is used, there is adequate warpage circumferentially in outer rim subassembly 80 to guarantee sufficient axial outward displacement of the sealing member 130 to the disc shoulder radius 54 to cause rapid venting to occur. In this further embodiment, the disc shoulder radius 54 serves as the equivalent of the air bleed passage means as contemplated by claim(s) of the aforementioned Strader '997 patent.

Wheel assembly 10 further includes an outer rim part 80 which comprises a cylindrical inboard free edge hoop portion 82 adapted to be slidably and telescopically received over disc flange 52 along radially inset surface 62 thereof, and an outboard bead retaining flange 84 integrally joined to hoop 82 an outboard 5° bead seat portion 86. The inboard edge of hoop 82 is provided with an inclined surface 88 which extends from the inner surface 90 of hoop 82 radially outwardly to a junction with a radial end face 92 extending outwardly to the outer surface 94 of hoop 82. Surface 88 is inclined at the same angle relative to the face 92 as surface 30 relative to surface 34, namely 30°, or at an angle 60° to the wheel axis, but in an opposite direction from surface 30 so as to incline radially inwardly in an outboard direction. Likewise, the surfaces 88 and 92 are finished machined to relatively precise dimensions.

Outer rim part 80 has a clamp ring 100 abutted at its outer periphery 102 to the underside of bead seat portion 86 of outer rim part 80 and secured thereto by outboard and inboard circumferentially continuous welds 104 and 106 or alternatively secured by only one weld such as the outboard weld 104. The inner periphery 108 of clamp ring 100 has a diameter greater than disc portion 48 to provide clearance therebetween. The inboard face 110 of ring 100 extends radially for flat abutment against the outboard surface 112 of disc mounting portion 50 when fully assembled as in FIG. 2. A plurality of threaded studs 120 are affixed to disc 40, as by press fit of a splined portion 122 of the stud, in corresponding openings 124 in disc portion 50, and studs 120 project axially in an outboard direction from disc portion 50 a predetermined distance so as to extend through corresponding openings 126 in ring 100. A plurality of lock-nuts 128 are individually received over the corresponding threaded stud ends for clamping ring 100 and outer rim part 80 onto the inner rim part-disc subassembly 16, 40.

Wheel assembly 10 also includes an O-ring seal 130 having an inside diameter slightly less than the diameter of surface 62 upon which the O-ring is positioned for abutment with sealing face 30 of inner rim part 16. O-ring 130 thus is stretched to encircle the outer surface of disc flange 52 and contacts surface 62 inboard of the inboard ends of the air vent slots 70. O-ring 130 is assembled in this position prior to assembly of the outer rim-clamp ring subassembly 80, 100 by sliding the O-ring over disc flange 52 and against the machined end face 30 of inboard or inner rim part 16.

In accordance with one feature of the present invention, in the fully assembled condition of these parts, the axial spacing between surfaces 30 and 88 is such that as to define in radial cross-section an equilateral triangle dimensioned in assembly of the parts to compress the O-ring seal 130 into this triangular space. This traps O-ring 130 in the equilateral triangular cavity and provides equal pressure on all three sealing faces 30, 88 and 62 in the deformed, compressed conditiion of the O-ring as shown in FIG. 2. The interior cavity of tire 12 is thus sealed against air leakage by O-ring 130 when clamp ring 100 is fully clamped against disc portion 50 by tightening of lock-nuts 128 to seat ring 100 against disc portion 50.

With the outer rim part 80 thus assembled to inner rim part 16 as shown in FIGS. 1 and 2, and with the internal cavity sealed by tire 12 and O-ring 130, the tire may be inflated by attaching a tire hose nozzle to the free end 140 of valve stem 26, valve stem 26 protruding through registering openings 142 in disc portion 50 and ring 100 as seen in FIG. 1. However, if clamping ring 100 and outer rim part 80 are not in fully assembled condition, such as illustrated in FIG. 3, or if it is attempted to disassemble outer rim part 80 by removal of nuts 128 with the tire inflated, compression forces on sealing ring 130 are removed and any pressurized air within or entering the tire cavity is vented to atmosphere past the O-ring 130 and between hoop 82 and surface 62 of disc flange portion 58 through one or more of the air bleed channels 70. As in the aforementioned Strader U.S. Pat. No. 4,481,997, it will be noted in particular that sufficient threads extend outboard of nuts 128 in the fully assembled position of these nuts thereon, that, in the event that the nuts are loosened during a disassembly operation with the tire inflated, sealing surface 88 on outer rim part 80 will not only move out of sealing engagement with O-ring 130, but can move well outboard of the inboard ends of vent slots 70 to insure full venting of the tire cavity to atmosphere through air leak passages 70 before nuts 128 can be removed from studs 120.

From the foregoing description it will now be apparent that a take-apart safety wheel 10 of the present invention provides a safety vent feature, which may be the type disclosed in the aforementioned Strader '997 patent, or the alternate shoulder vent air bleed passage means construction described hereinabove, and yet possesses several advantages thereover. Since the hoop portion 82 of outer rim part 80 is dimensioned to telescopically slide on disc flange surface 62, rather than to have clearance therebetween so as to override the O-ring as in the Strader '997 construction, it is impossible for the inner surface 90 of hoop portion 82 to override O-ring seal 130 during wheel assembly. Rather, sealing faces 88 and 30, being radially equidistant from the wheel axis, are juxtaposed axially to trap and compress O-ring 130 therebetween in the aforementioned triangular cavity. Hence, movement of hoop portion 82 toward inner rim part 16 during the assembly process cannot displace seal 130 from its proper ultimate sealing position.

In addition, by making disc 40 as a separate piece from inner rim part 16, and by telescoping rim base 18 over disc flange 52, valve turret 24 may be located farther radially outwardly from the wheel axis to thereby improve the valve turret/stem-to-brake clearance for a given wheel size since the inner and outer rim parts need no longer telescopically overlap. This also contributes to an improved brake dust shield clearance as compared to the design in the Strader '997 patent. Likewise, the inner and outer rim parts 16 and 80 can be made of various selected thicknesses of material if required for differing applications without thereby changing the stock thickness of the disc 40. Hence, a standardized disc 40 can be used for various rim parts 80 and 16 having thicknesses differing from the disc, and vice versa.

Typically, it is usual that a vehicle manufacturer will specify the disc offset to achieve a desired vehicle track width given the axial spacing between wheel mounting flanges on the particular axle combination used on a vehicle. The wheel offset, as it is called, is usually different from vehicle to vehicle. Often, larger or smaller tires may be used to economically support differing rated loads of vehicle models derived from the base model vehicle. This requires that a variety of wheel widths and offsets be available for one particular wheel diameter. The present invention accomplishes this as outlined below.

Since the diameters of both rim halves are equal to each other, it is therefore possible to manufacture the rim halves in one piece by any of the usual methods, then split the resulting rim at any suitable location along its flat center diameter to create the separate rim halves. This allows placement of the disc portion at different positions to accommodate a variety of wheel offsets from a standard set of component parts. Hence, many differing vehicle models using the same wheel size in width and diameter may be properly fitted.

Alternately, if the rim halves are formed separately, the common diameters allow use of common tooling for manufacture by using differing widths of metal hoops as preforms for the differing widths of finished rims. Thus also, may differing wheel widths be easily made on the common diameter by altering the combination of rim half widths used in the construction of that wheel.

From the foregoing, it can be seen that the greatest economy of manufacture is afforded to produce wheels of a common diameter but of varying widths and disc offsets.

Moreover, disc 40 can be made on exisiting conventional stamping equipment, and rim parts 16 and 80 on conventional roll forming or die stamping equipment so that spin forming equipment and operations need not be utilized in the manufacture of wheel 10. Moreover, the subassembly of disc 40 and inner rim 16 can be made on conventional existing rim/disc press fit and welding equipment.

The design of disc 40 with its radial ring mounting portion 50 and the studs 120 press fit therethrough eliminates the skip welds associated with the securement of the threaded studs 48 or 120 of the Strader '997 patent, while at the same time eliminating any welds in the area of the O-ring sealing surfaces 62, 30 and 88. Thus, in addition to overcoming previous leakage problems in the weld areas, the wheel assembly 10 of the invention possesses inherent features of simplicity and design flexibility rendering it more economical to make production run changes in the rim parts or the disc parts to accommodate different sizes of tires (width variations), disc offsets and bolt circles.

It is to be understood that the geometry of surfaces 30 and 88 may vary from the preferred symetrical angulation to provide a non-equilateral triangular cavity between surfaces 30, 88 and 62 in assembled relationship. Nevertheless the equilateral relationship is preferred for obtaining equal engagement pressure on all three sealing faces, as well as to facilitate both initial positioning of O-ring 130 on disc 40 and to insure outer rim part 80 pushing the seal to abutted position with surface 30 should it be initially displaced in an outboard direction therefrom.

It is also to be understood that, although the foregoing description and drawings describe and illustrate in detail one successful working embodiment of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims and the applicable prior art.

We claim:

1. A wheel rim and disc assembly for use in a safety tire and wheel assembly which includes a pneumatic tubeless tire, said wheel rim and disc assembly comprising:

an inboard rim part including a rim base and an inboard tire bead retaining flange integrally carried at an inboard edge of said rim part, said inboard rim part having a cylindrical band terminating at an outboard free edge of said rim base remote from said inboard flange of said inboard rim part, a wheel mounting disc having a central wheel mounting portion and an outer marginal flange telescoped into and secured to said cylindrical band, said disc flange having an outer surface protruding axially outboard beyond and clear of said inboard rim part free edge, an outboard rim part comprising demountable flange means including a cylindrical hoop adapted to be telescopically received from an axially outboard direction over said disc flange outer surface and an outboard tire bead retaining flange integrally projecting from an outboard edge of said hoop, said hoop terminating at an inboard free edge, annular resilient sealing means disposed between said outer surface of said outer marginal flange of said disc, said inboard free edge of said hoop of said outboard rim part and said rim base band free edge of said inboard rim part, and means for axially clamping said outboard rim part on said inboard rim part with said sealing means being captured in compression between said free edges and said outer surface of said disc flange so as to seal against air leakage from the internal cavity of a tire mounted on said wheel rim and disc assembly, said disc having air bleed means outboard of said sealing means and normally sealed from the tire cavity by said sealing means, said clamping means being constructed and adapted to engage and exert clamping stress on said outboard rim part over a range of relative movement therebetween in the axial direction of said inboard rim part which is sufficient to permit loss of sealing pressure at said sealing means prior to loss of clamping engagement at said clamping means to thereby permit air leakage past said sealing means through said air bleed means to atmosphere within said range or relative movement, said outer surface of said disc flange comprising a generally cylindrical first sealing surface, said outboard free edge of said rim part having a second sealing surface inclined radially inwardly and in an inboard direction relative to the wheel axis, and said outboard rim part inboard edge having a third sealing surface inclined radially inwardly in an outboard direction relative to the wheel axis, said first, second and third sealing surfaces when juxtaposed to sealably compress said sealing means thereby defining an annular cavity which in radial cross-section generally defines a triangle, said sealing means being bodily movable along said first sealing surface axially of said wheel assembly by tire internal cavity air pressure upon mutual separation of said second and third sealing surfaces in response to said relative separational movement of said rim parts.

2. The wheel rim assembly as set forth in claim 1 wherein said disc outer marginal flange is press fit into said cylindrical band of said inboard rim part and secured thereto by a circumferential weld at the junction of an axially inboard edge of said disc flange and juxtaposed adjacent inner surface of said cylindrical band of said rim part.

3. The wheel rim assembly as set forth in claim 1 wherein said disc air bleed means, said outboard rim part and said clamping means are cooperable to permit air leakage from the tire internal cavity past said sealing means through said air bleed means to atmosphere upon improper mounting of said demountable flange means on said disc and inboard rim part.

4. The wheel rim assembly as set forth in claim 1 wherein said clamping means comprises first threaded means carried by said disc and means coupled to said outboard rim part including second threaded means adapted to be received by said first threaded means, said first and second threaded means being dimensioned in the axial direction of said rim base means sufficiently to permit loss of sealing engagement at said sealing means prior to loss of threaded engagement at said threaded means upon loosening of said threaded means.

5. The wheel assembly as set forth in claim 4 wherein said disc has a stock thickness different from the stock thickness of said inboard and outboard rim parts.

6. The wheel assembly as set forth in claim 5 wherein said disc has a radially extending clamp mounting portion between said disc flange and said disc central mounting portion and said clamping means comprises a ring secured to said outboard rim part adapted to seat against said disc clamp mounting portion.

7. The wheel assembly set forth in claim 6 wherein said cylindrical hoop of said outboard rim part demountable flange means has a sliding fit as telescopically received onto said disc flange outer surface.

8. The wheel assembly set forth in claim 7 wherein said outboard rim part has a 5° bead seat portion between said cylindrical hoop and said outboard tire bead retaining flange, and said clamping ring is abutted at its outer periphery to said bead seat portion and secured thereto by weld means.

9. The wheel rim assembly set forth in claim 4 wherein said first threaded means comprises a plurality of threaded studs affixed in a circumferential array to said disc, and wherein said second threaded means comprises a plurality of nuts received onto said studs, the threaded length of said studs being such as to permit loss of sealing at said sealing means before said nuts are removed from said studs.

10. The wheel rim assembly as set forth in claim 4 wherein said air bleed means comprises a shoulder radius on said disc between said central wheel mounting portion of said disc and said outer surface of said outer marginal flange of said disc, said annular resilient means being displaceable by tire interior air pressure axially along said disc outer surface onto said disc shoulder radius to thereby lose sealing engagement with said sealing surfaces as said threaded means are loosened but still interengaged and thereby allow flexure and/or warpage of said demountable flange means in response to tire bead lateral expansion forces exerted by the tire interior cavity air pressure.

11. The wheel rim assembly as set forth in claim 1 wherein said second and third sealing surfaces are each inclined radially at an angle of about 60° to the wheel axis to thereby define with said first sealing surface said annular cavity which in radial cross-section defines a generally equilateral triangle.

12. The wheel assembly as set forth in claim 11 wherein of said three sealing surfaces, only said second and third sealing surfaces are machined to finish dimension and angulation.

* * * * *